US006756473B2

(12) United States Patent
Reuter et al.

(10) Patent No.: US 6,756,473 B2
(45) Date of Patent: Jun. 29, 2004

(54) PROCESS FOR THE PREPARATION OF NEUTRAL POLYETHYLENEDIOXYTHIOPHENE, AND CORRESPONDING POLYETHYLENEDIOXYTHIOPHENES

(75) Inventors: Knud Reuter, Krefeld (DE); Stephan Kirchmeyer, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/323,477

(22) Filed: Dec. 18, 2002

(65) Prior Publication Data

US 2003/0139505 A1 Jul. 24, 2003

(30) Foreign Application Priority Data

Dec. 27, 2001 (DE) ......................................... 101 64 260

(51) Int. Cl.[7] .............................................. C08G 75/00
(52) U.S. Cl. ........................ 528/377; 528/373; 528/380; 528/403; 528/425; 528/480; 528/491
(58) Field of Search ................................ 528/377, 373, 528/380, 403, 425, 480, 491

(56) References Cited

U.S. PATENT DOCUMENTS

| 4,959,430 A | 9/1990 | Jonas et al. .................. 339/257 |
| 4,987,042 A | 1/1991 | Jonas et al. .................. 339/213 |
| 5,035,926 A | 7/1991 | Jonas et al. .............. 339/393.1 |
| 5,300,575 A | 4/1994 | Jonas et al. .................. 440/186 |

OTHER PUBLICATIONS

Lee et al, Synthesis and characterization of a soluable and transparent conducting polymer, poly(3,4–ethylenedioxythiophene), Gordon & Breach Science Publishers, 1999, Chem Abstract 131: 287096.*
Kudou et al, Thermally stable electroconductive polymer compositions and their manufacture method, Japanese Kokai, 1999, Chem Abstract 130: 283144.*
Lee et al, Synthesis and characterization of a soluble conducting polymer, poly(3,4–ethylenedioxythiophene), Polymer Society of Korea, Chem Abstract 130: 252755.*
De Sanoit et al, Method for preparing a conductor polymer film for producing a radioactive source, FR Demande, Chem Abstract 128; 107595.*
Hatanaka et al, Solid electrolytic capacitor and its manufacture, Japanese, 1997, Chem Abstract 127: 365132.*
Havinga et al, Absorption properties of alkoxy–substituted Thienylene–Vinylene Oligomers as a function of a doping level, American Chemical society, Chem Abstract 124: 203512.*
Pei. O., et al. "Electrochromic and highly stable poly(3, 4–ethylenedioxythiophene) switches between opaque blue–black and transparent sky blue." Polymer, vol. 35, No. 7, 1994, 1347–1351.

Yamamoto, T. et al. "Synthesis of non–doped poly(3,4–ethylenedioxythiophene) and its spectroscopic data." Synthetic Metals 100 (1999), 237–239.
Garreau, S., In Situ Spectroelectrochemical Raman Studies of Poly(3,4– ethylenedioxythiophene) PEDT). Macromolecules 1999, 32, 6807–6812.
Yamamoto, T., et al., "Neutral poly(3,4– ethylenedioxythiophene–2,5diyl)s: preparation by organometallic polycondensation and their unique doping behavior." Polymer 43 (2002), 711–719.
Tran–Van, F., Fully undoped and soluble oligo(3,4– ethylenedioxythiophene)s: spectroscopic study And electrochemical characterization. J. Mater. Chem., 2001, 11, 1378–1382.
Tran–Van, F., "A fully undoped oligo(3,4 ethylenedioxythiophene): spectroscopic properties." Synthetic Metals 119 (2001), 381–382.
Groenendaal, L.B., et al., Poly (3,4– ethylenedioxythiophene) and Its Derivatives: Past, Present, and Future. Advanced Materials 2000, 12 No. 7, 481–494.
Sankaran, B., et al., "Synthesis and Electrochemistry of Polydioxyethylenethiophene and its Alkyl Substituted Derivative." Dept. of Chem. Center for Macromolecular Sci. and Engr., University of Fla., 319–320.
Sankaran, B., et al., "High–Contrast Electrochromic Polymers from Alkyl–Derivatized Poly (3,4– ethylenedioxythiophenes)." Macromolecules 1997, 30, 2582–2588.

(List continued on next page.)

Primary Examiner—Duc Truong
(74) Attorney, Agent, or Firm—Godfried R. Akorli; Diderico van Eyl

(57) ABSTRACT

Process for the preparation of neutral poly(ethylene-3,4-dioxythiophenes) of the general formula (I)

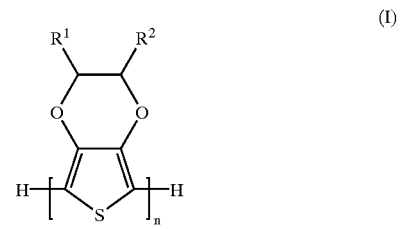

in which

R[1] and R[2], independently of one another, each represent H or $C_1$ to $C_9$-alkyl, it also being possible for R[2] to be $CH_2$—O—R[3] with R[3]=H or $C_1$ to $C_9$-alkyl, cycloalkyl or aralkyl, when R[1] represents H, and n represents 2 to 200, suitable thiophene monomers being reacted in an organic solvent with an oxidizing agent and the oxidizing agent being used in 50 to 99.9% of the stoichiometrically required amount. The neutral poly(ethylene-3,4-dioxythiophenes) thus obtainable are distinguished in particular by their solubility in organic solvents.

23 Claims, No Drawings

OTHER PUBLICATIONS

Kumar, A. et al., "Soluble Alkyl–Substituted Poly(ethylene-dioxythiophenes) as Electrochromic Materials." Macromolecules 1996, 29, 7629–7630.

Kumar, A. et al., "Conducting Poly(3,4– alkylenedioxythiophene) Derivatives as Fast Electrochromics with High–Contrast Ratios." Chem. Mater. 1998, 10, 896–902.

Supporting information for Kumar, A. et al., "Conducting Poly(3,4– alkylenedioxythiophene) Derivatives as Fast Electrochromics with High–Contrast Ratios." Chem. Mater. 1998, 10, 896–902.

Welsh, D.M., et al., "Fast Electrochromic Polymers Based in New Poly(3–4 alkylenedioxythiophene) Derivatives." Synthetic Materials 102 (1999) 967–968.

Schottland, P., et al., "Langmuir–Blodgett films of an alkoxy derivative of poly(3,4– ethylenedioxythiophene)." Synthetic Materials 1996, 8, 7–8.

Havinga, E.E., et al., "Absorption Properties of Alkoxy–Substituted Thienylene–Vinylene Oligomers as a Function of the Doping Level." Chem. Mater. 1996, 8, 769–776.

Shiraishi, K., et al. "Preparation of a soluble and neutral alkyl derivative of poly(3–4 ethylenedioxythiophene) and its optical properties." Polymer 42 (2001) 7229–7232.

Schottland, P., "Synthesis and polymerization of new monomers derived from 3,4– ethylenedioxythiophene." J. Chim. Phys. (1998) 95, 1258–1261.

* cited by examiner

PROCESS FOR THE PREPARATION OF NEUTRAL POLYETHYLENEDIOXYTHIOPHENE, AND CORRESPONDING POLYETHYLENEDIOXYTHIOPHENES

BACKGROUND OF THE INVENTION

1. Field of the Invention

The invention relates to a process for the preparation of neutral polythiophenes based on 3,4-alkylenedioxythiophenes, in particular 3,4-ethylenedioxythiophene (also 2,3-dihydrothieno[3,4-b][1,4]dioxine), neutral polythiophenes soluble in organic solvents, and their use.

2. Brief Description of the Prior Art

The pertinent class of compounds which consists of the π-conjugated polymers has been the subject of numerous publications in recent decades. They are also referred to as conductive polymers or as synthetic metals. Owing to the considerable delocalization of the π-electrons along the main chain, these polymers exhibit interesting (nonlinear) optical properties and are good electrical conductors after oxidation or reduction. Consequently, these compounds can be used in various practical applications, such as, for example, in data storage, optical signal processing, suppression of electromagnetic interference (EMI) and conversion of solar energy, and in rechargeable batteries, light-emitting diodes, field effect transistors, circuit boards, sensors, capacitors and antistatic materials.

Examples of known π-conjugated polymers are polypyrroles, polythiophenes, polyanilines, polyacetylenes, polyphenylenes and poly(p-phenylene-vinylenes). A particularly important and industrially used polythiophene is poly(ethylene-3,4-dioxythiophene), which has very high conductivities in its doped form, cf. for example EP 339 340 A2. The preparation of the doped poly(ethylene-3,4-dioxythiophene) is effected according to EP 339 340 A2 by oxidative polymerization of 3,4-ethylenedioxythiophene. The processibility of the product is achieved, for example, by the use of poly(styrenesulphonate) as a counter ion in aqueous dispersion.

In comparison, products which are likewise highly conductive but unprocessible are obtained, for example in the form of coatings, by electropolymerization (e.g. "Q. Pei, G. Zuccarello, M. Ahlskog and O. Inganäs, Polymer 35 (1994), pages 1347–1351").

According to "T. Yamamoto & M. Abla, Synth. Met. 100 (1999), pages 237–239", it is not possible completely to eliminate the doping of a doped poly(ethylene-3,4-dioxythiophene) prepared according to EP 339 340 A2 or prepared in a similar manner by oxidative polymerization, and thus to prepare a neutral—and thereby undoped—poly(ethylene-3,4-dioxythiophene). Doping according to Yamamoto means oxidation and thereby generating positive charged poly(ethylene-3,4-dioxythiophene).

According to "S. Garreau, G. Louarn, J. P. Buisson, G. Froyer, S. Lefrant, Macromolecules 32, (1999) pages 6807–6812", it is just as impossible completely to dedope the electrochemically produced doped poly(ethylene-3,4-dioxythiophene) by an electrochemical method.

Neutral poly(ethylene-3,4-dioxythiophene) has therefore always been prepared to date by so-called reductive, organometallic synthesis from 2,5-dihalogeno-ethylene-3,4-dioxythiophene. "Synth. Met. 100 (1999), pages 237–239" and "Polymer 43 (2002), pages 711–719" disclose a process for the preparation of neutral, undoped poly(ethylene-3,4-dioxythiophene) by dehalogenating polycondensation of 2,5-dichloro-ethylene-3,4-dioxythiophene in the presence of bis(1,5-cyclooctadiene)nickel(0). However, only an insoluble poly(ethylene-3,4-dioxythiophene) can be obtained by this process.

"J. Mater. Chem. 11, (2001) pages 1378–1382" describes the preparation of soluble, neutral, undoped poly(ethylene-3,4-dioxythiophene) by polycondensation of 2,5-dibromo-ethylene-3,4-dioxythiophene in the presence of Ni(0) prepared in situ. As a result of the preparation, however, a material synthesized in this manner contains organically bound bromine. Owing to the danger of HBr or bromide elimination, such chemically noninert terminal groups on the polymer are undesired in applications in the electronics industry. Moreover, this product has also been described as being only partly soluble in dimethylacetamide.

In addition, the processes, described in "Synth. Met. 100 (1999), pages 237–239", "J. Mater. Chem. 11, (2001) pages 1378–1382" and "Synth. Met. 119 (2001), pages 381–382" are not economical compared with simple oxidative polymerization processes, owing to the additional synthesis step via the 2,5-dihalogenoethylene-3,4-dioxythiophene and the use of expensive, sensitive organometallic reagents.

One possibility for obtaining soluble, neutral and undoped derivatives of poly(ethylene-3,4-dioxythiophene) which are soluble in organic solvents by oxidative polymerization consists in substitution of the ethylene unit by alkyl or alkoxymethyl groups having 10 or more C atoms. Correspondingly substituted poly(ethylene-3,4-dioxythiophenes) are described in "Adv. Mater. 12, (2000) pages 481–494", "Polym. Mater. Sci. Eng. 72, (1995) page 319 et seq.", "Macromolecules 30, (1997) page 2582 et seq.", "Macromolecules 29, (1996) page 7629 et seq.", "Chem. Mater. 10, (1998) page 896 et seq.", "Synth. Met. 102, (1999) page 967 et seq.", "J. Chim. Phys. 95, (1998) page 1258 et seq.", "Synth. Met. 101, (1999) pages 7–8" and "Chem. Mater. 8, (1996) pages 769–776". Common to all articles mentioned is that neutral and therefore undoped derivatives of poly(ethylene-3,4-dioxythiophene) which are soluble in organic solvents are obtained only when the substituents on the ethylene unit of the 3,4-ethylenedioxythiophene have at least 10 carbon atoms.

"Polymer 42 (2001), pages 7229–7232" describes a neutral, undoped polymer of 2-n-hexyl-2,3-dihydrothieno[3,4-b][1,4]dioxine units. However, the preparation is effected via the complicated synthesis method described in "Synth. Met. 100 (1999), pages 237–239", by polycondensation of the 2,5-dichlorothiophene derivative in the presence of Ni(0); on the other hand, the oxidative synthesis was designated as being unsuitable as the preparation method.

EP 686 662 A2 mentions a neutral poly(ethylene-3,4-dioxythiophene). However, the polymerization is carried out according to EP 339 340 A2 and EP 440 957 A2. However, doped, nonneutral poly(ethylene-3,4-dioxythiophene) is prepared in this manner. A comparison of the properties of poly(ethylene-3,4-dioxythiophene) prepared according to EP 686 662 A2 with the properties of neutral poly(ethylene-3,4-dioxythiophene) which is without a doubt undoped and which is prepared according to "Synth. Met. 100 (1999), pages 237–239" or "J. Mater. Chem. 11, (2001) pages 1378–1382" also shows that EP 686 662 A2 by no means describes neutral poly(ethylene-3,4-dioxythiophene).

No process is known to date for the preparation of neutral and therefore undoped poly(ethylene-3,4-dioxythiophene)

or derivatives which carry a $C_1$-$C_9$-alkyl substituent on the ethylene unit by an oxidative method.

The preparation of a completely halogen-free poly(ethylene-3,4-dioxythiophene) which is also soluble in organic solvents has been just as impossible to date.

It is an object of the present invention to prepare neutral poly(ethylene-3,4-dioxythiophene) which is soluble in organic solvents and free of organically bound halogen, or poly(ethylene-3,4-dioxythiophene) derivatives substituted by short chains and unknown to date in neutral form and in a form dissolved in organic solvents, by an economical and simple method.

SUMMARY OF THE INVENTION

The invention thus relates to a process for the preparation of neutral compounds of the general formula (I),

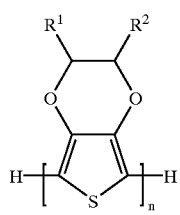

(I)

in which

R$^1$ and R$^2$, independently of one another, each represent H or $C_1$ to $C_9$-alkyl, it also being possible for R$^2$ to represent CH$_2$—O—R$^3$, with R$^3$=H or $C_1$ to $C_9$-alkyl, cycloalkyl or aralkyl, when R$^1$ represents H, and n represents an integer from 2 to 200, by reaction of monomers of the general formula (II),

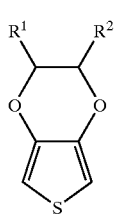

(II)

in which

R$^1$ and R$^2$ have the abovementioned meanings, with an oxidizing agent, the reaction being carried out in an organic solvent and the oxidizing agent being used in an amount of 50 to 99.9% of the stoichiometrically required amount.

DETAILED DESCRIPTION OF THE INVENTION

The invention is described more fully hereunder with particular reference to its preferred embodiments, as follows. R$^1$ and R$^2$, independently of one another, are each preferably H or $C_1$ to $C_5$-alkyl, it also being possible for R$^2$ to denote CH$_2$—O—R$^3$, where R$^3$=H or $C_1$ to $C_5$-alkyl, when R$^1$ represents H. R$^1$ and R$^2$, independently of one another, particularly preferably each represent H or $C_1$ to $C_2$-alkyl, it also being possible for R$^2$ to denote CH$_2$—O—R$^3$, where R$^3$=H or $C_1$ to $C_4$-alkyl, when R$^1$ represents H. R$^1$ and R$^2$ particularly preferably represent H.

The neutral compounds according to the invention are also called neutral, undoped compounds.

The reaction according to the invention is carried out in an organic solvent. An organic aprotic solvent is preferably used, in particular a halogenated hydrocarbon is used. A halogenated hydrocarbon from the group consisting of chloroform, methylene chloride and chlorobenzene is very particularly preferably used.

The oxidizing agents used may be the oxidizing agents customary for the oxidative polymerization of thiophenes and known to a person skilled in the art, it being possible for certain restrictions to apply depending on the chosen reaction conditions and in particular on the chosen organic solvent. For given reaction conditions, suitable oxidizing agents can readily be determined by means of simple preliminary experiments.

A preferably used oxidizing agent is an iron(III) compound, particularly preferably used oxidizing agent is iron(III) chloride or iron(III) tosylate, very particularly preferably used oxidizing agent is iron(III) chloride.

An important feature of the process according to the invention is the fact that the oxidizing agent is typically used in less than stoichiometric amounts, i.e. in an amount of 50 to 99.9% of the stoichiometrically required amount. For the polymerization of a thiophene monomer, theoretically 2 equivalents of the oxidizing agent are required per mole of the monomer. It is essential for the invention that not more than 99.9%, preferably not more than 99%, and at least 50%, preferably at least 75%, of the stoichiometrically required amount of oxidizing agent are used. Particularly preferably, 80 to 96% of the stoichiometrically required amount are used.

Accordingly, when carrying out the process according to the invention, it should be ensured that the reactants are always present in the reaction mixture in amounts such that an excess of oxidizing agent of more than 1.998:1, relative to the monomer present in the reaction mixture, is never present. Thus, preferred reaction procedures are those in which the thiophene monomer is initially introduced and the oxidizing agent is metered in in portions or continuously so that more than 1.998 mol, at the most, of the oxidizing agent cannot be present at any time per mole of monomer in addition to the monomer. As a rule, however, the reaction is carried out in such a way that the molar ratio of oxidizing agent to monomer is substantially less than 1.998:1 during the entire reaction time.

The process according to the invention can be carried out at room temperature. However, it may also be expedient to work at lower temperatures, e.g. 0° C., or at higher temperatures, e.g. at the reflux temperature of chloroform (about 60° C.) or an even higher temperature, which is possible, for example, in chlorobenzene. 0 to 100° C. is preferably employed, particularly preferably employed is 15 to 65° C.

In the process, particularly if iron(III) tosylate or iron(III) chloride is used as the oxidizing agent, the yield of desired neutral polythiophene can be increased if a base is added in at least equimolar amounts during the reaction for neutralizing acids (p-toluenesulphonic acid or HCl) formed from the oxidizing agent. Such a procedure is therefore preferred. Suitable bases are, for example, ammonia, amines or basic metal oxides. However, alkali metal or alkaline earth metal carbonates, e.g. sodium carbonate, potassium carbonate or calcium carbonate, are preferably used.

The reaction can be carried out under air or under an inert gas, e.g. nitrogen or argon. Carrying out the reaction under an inert gas is advantageous for increasing the yields, but is not essential.

Monomers used in the process according to the invention are ethylene-3,4-dioxythiophenes of the formula (II) which are optionally substituted on the ethylene unit. According to IUPAC, such compounds are designated as 2,3-dihydrothieno[3,4-b][1,4]dioxines.

Suitable monomers are listed below by way of example using the IUPAC nomenclature.

The following may be mentioned by way of example as suitable monomers of the formula (II), in which $R^1$ is H and $R^2$ is H or $C_1$ to $C_9$-alkyl:

2,3-dihydrothieno[3,4-b][1,4]dioxine, 2-methyl-2,3-dihydrothieno[3,4-b][1,4]dioxine, 2-ethyl-2,3-dihydrothieno[3,4-b][1,4]dioxine, 2-n-propyl-2,3-dihydrothieno[3,4-b][1,4]dioxine, 2-n-butyl-2,3-dihydrothieno[3,4-b][1,4]dioxine, 2-n-pentyl-2,3-dihydrothieno[3,4-b][1,4]dioxine, 2-n-hexyl-2,3-dihydrothieno[3,4-b][1,4]dioxine, 2-n-heptyl-2,3-dihydrothieno[3,4-b][1,4]dioxine, 2-n-octyl-2,3-dihydrothieno[3,4-b][1,4]dioxine, 2-(2-ethyl-hexyl)-2,3-dihydrothieno[3,4-b][1,4]dioxine, 2-nonyl-2,3-dihydrothieno[3,4-b][1,4]dioxine.

Preferred examples from this group are 2,3-dihydrothieno[3,4-b][1,4]dioxine, 2-methyl-2,3-dihydrothieno[3,4-b][1,4]dioxine, 2-ethyl-2,3-dihydrothieno[3,4-b][1,4]dioxine, 2-n-propyl-2,3-dihydrothieno[3,4-b][1,4]dioxine, 2-n-butyl-2,3-dihydrothieno[3,4-b][1,4]dioxine, 2-n-pentyl-2,3-dihydrothieno[3,4-b][1,4]dioxine.

Particularly preferred examples from this group are 2,3-dihydrothieno[3,4-b][1,4]dioxine, 2-methyl-2,3-dihydrothieno[3,4-b][1,4]dioxine, 2-ethyl-2,3-dihydrothieno[3,4-b][1,4]dioxide.

2,3-Dihydrothieno[3,4-b][1,4]dioxine is very particularly preferred.

The following may be mentioned by way of example as suitable monomers of the formula (II), in which $R^1$ and $R^2$, independently of one another, represent $C_1$ to $C_9$-alkyl:

2,3-dimethyl-2,3-dihydrothieno[3,4-b][1,4]dioxine, 2,3-diethyl-2,3-dihydrothieno[3,4-b][1,4]dioxine, 2,3-di-n-propyl-2,3-dihydrothieno[3,4-b][1,4]dioxine, 2,3-di-n-butyl-2,3-dihydrothieno[3,4-b][1,4]dioxine.

The following may be mentioned by way of example as suitable monomers of the formula (II), in which $R^1$ represents H and $R^2$ represents —$CH_2$—O—$R^3$ with $R^3$=H, $C_1$-$C_9$-alkyl, $C_1$-$C_9$-cycloalkyl or $C_1$-$C_9$-aralkyl:

2,3-dihydrothieno[3,4-b][1,4]dioxin-2-ylmethanol, 2-(methoxymethyl)-2,3-dihydrothieno[3,4-b][1,4]dioxine, 2-(ethoxymethyl)-2,3-dihydrothieno[3,4-b][1,4]dioxine, 2-(n-propoxymethyl)-2,3-dihydrothieno[3,4-b][1,4]dioxine, 2-(n-butoxymethyl)-2,3-dihydrothieno[3,4-b][1,4]dioxine, 2-(n-pentyloxymethyl)-2,3-dihydrothieno[3,4-b][1,4]dioxine, 2-(n-hexyloxymethyl)-2,3-dihydrothieno[3,4-b][1,4]dioxine, 2-(n-heptyloxymethyl)-2,3-dihydrothieno[3,4-b][1,4]dioxine, 2-(n-octyloxymethyl)-2,3-dihydrothieno[3,4-b][1,4]dioxine, 2-(2-ethylhexyloxymethyl)-2,3-dihydrothieno[3,4-b][1,4]dioxine, 2-(n-nonyloxymethyl)-2,3-dihydrothieno[3,4-b][1,4]dioxine, 2-(cyclopentyloxymethyl)-2,3-dihydrothieno[3,4-b][1,4]dioxine, 2-(cyclohexyloxymethyl)-2,3-dihydrothieno[3,4-b][1,4]dioxine, 2-(benzyloxymethyl)-2,3-dihydrothieno[3,4-b]-[1,4]dioxine.

Preferred monomers from this group are: 2,3-dihydrothieno[3,4-b][1,4]dioxin-2-ylmethanol, 2-(methoxymethyl)-2,3-dihydrothieno[3,4-b][1,4]dioxine, 2-(ethoxymethyl)-2,3-dihydrothieno[3,4-b][1,4]dioxine, 2-(n-propoxymethyl)-2,3-dihydrothieno[3,4-b][1,4]dioxine, 2-(n-butoxymethyl)-2,3-dihydrothieno[3,4-b][1,4]dioxine, 2-(n-pentyloxymethyl)-2,3-dihydrothieno[3,4-b][1,4]dioxine.

Particularly preferred monomers from this group are: 2,3-dihydrothieno[3,4-b][1,4]dioxin-2-ylmethanol, 2-(methoxymethyl)-2,3-dihydrothieno[3,4-b][1,4]dioxine, 2-(ethoxymethyl)-2,3-dihydrothieno[3,4-b][1,4]dioxine, 2-(n-propoxymethyl)-2,3-dihydrothieno[3,4-b][1,4]dioxine, 2-(n-butoxymethyl)-2,3-dihydrothieno[3,4-b][1,4]dioxine.

The concentration of the monomers in the organic solvent can be chosen within a wide range. The monomer is preferably used in a concentration of 0.2 to 5% by weight.

By means of the process according to the invention, it is possible to prepare neutral polymers of the formula I, in which n represents an integer from 2 to 200, preferably 2 to 50, particularly preferably 2 to 30.

It is also possible to obtain neutral copolymers of the formulae (III) or (III a),

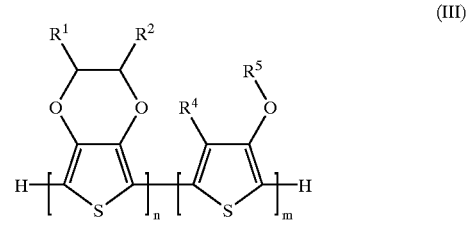

(III)

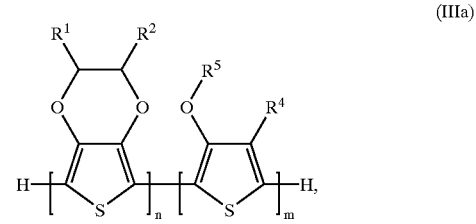

(IIIa)

in which $R^1$ and $R^2$, independently of one another, each represent H or $C_1$ to $C_9$-alkyl, it also being possible for $R^2$ to be $CH_2$—O—$R^3$, with $R^3$=H or C to $C_9$-alkyl, cycloalkyl or aralkyl, when $R^1$ represents H, $R^4$ represents a linear or branched alkyl group having 1 to 18 C atoms, an optionally $C_1$- to $C_6$-alkyl-substituted cycloalkyl group having a total of 5 to 12 C atoms, an optionally substituted aryl group having 6 to 10 C atoms or a linear or branched $C_1$–$C_{18}$-alkoxy group, $R^5$ represents a linear or branched alkyl group having 1 to 18 C atoms, an optionally $C_1$- to $C_6$-alkyl-substituted cycloalkyl group having a total of 5 to 12 C atoms, an optionally substituted aryl group having 6 to 10 C atoms or an aralkyl group having 7 to 12 C atoms, and n and m, independently of one another, represent an integer from 1 to 200.

For this purpose, the procedure as described above is adopted, a mixture of a compound of the formula (II) and a compound of the formula (IV)

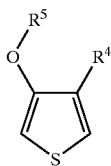

(IV)

in which
- $R^4$ represents a linear or branched alkyl group having 1 to 18 C atoms, an optionally $C_1$- to $C_6$-alkyl-substituted cycloalkyl group having a total of 5 to 12 C atoms, an optionally substituted aryl group having 6 to 10 C atoms or a linear or branched $C_1$–$C_{18}$-alkoxy group, and
- $R^5$ represents a linear or branched alkyl group having 1 to 18 C atoms, an optionally $C_1$- to $C_6$-alkyl-substituted cycloalkyl group having a total of 5 to 12 C atoms, an optionally substituted aryl group having 6 to 10 C atoms or an aralkyl group having 7 to 12 C atoms, being used as monomer.

Corresponding thiophene polymers or copolymers have not been obtainable to date by an oxidative method in a neutral, undoped form soluble in organic solvents. The thiophene polymers and copolymers are distinguished in particular by the fact that they are soluble in organic solvents and free of organically bound halogen.

The invention also relates to neutral compounds of the general formula (I),

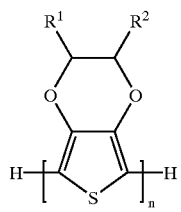

(I)

in which
- $R^1$ and $R^2$, independently of one another, each represent H or $C_1$ to $C_5$-alkyl, it also being possible for $R^2$ to be $CH_2$—O—$R^3$, with $R^3$=H or $C_1$ to $C_9$-alkyl, cycloalkyl or aralkyl, when $R^1$ represents H, and
- n represents an integer from 2 to 200, these being soluble in organic solvents and being free of organically bound halogen.

Compounds which can be dissolved in an amount of at least 1% by weight, preferably at least 5% by weight, particularly preferably at least 10% by weight, in at least one organic solvent are designated as being soluble in the context of this application. Organic solvents are understood as meaning, for example, halogenated aliphatic hydrocarbons, aromatic hydrocarbons, halogenated aromatic hydrocarbons, dialkyl ethers, cyclic ethers and dipolar aprotic organic solvents.

The compounds according to the invention preferably dissolve in an amount of at least 1% by weight in an organic solvent selected from the group: chloroform, methylene chloride and tetrahydrofuran. They preferably dissolve in an amount of at least 5% by weight, particularly preferably in an amount of at least 10% by weight.

Compounds understood as being free of halogen are those which contain less than 1000 ppm, preferably less than 500 ppm, particularly preferably less than 100 ppm, of halogen.

Neutral compounds of the general formula I, in which $R^1$ and $R^2$, independently of one another, represent H or $C_1$ to $C_2$-alkyl, or $R^1$ denotes H and $R^2$ denotes $CH_2$—O—$R^3$ with $R^3$=H or C, to $C_4$-alkyl, are preferred.

Compounds of the formula I in which $R^1$ and $R^2$ represent H are particularly preferred.

The invention furthermore relates to neutral copolymers of the formulae (III) or (III a),

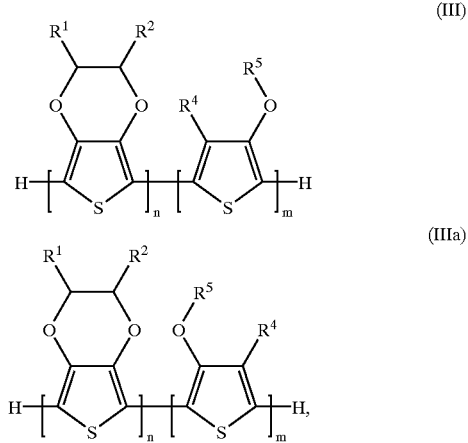

in which
- $R^1$ and $R^2$, independently of one another, each represent H or $C_1$ to $C_9$-alkyl, it also being possible for $R^2$ to be $CH_2$—O—$R^3$, with $R^3$=H or $C_1$ to $C_9$-alkyl, cycloalkyl or aralkyl, when $R^1$ represents H,
- $R^4$ represents a linear or branched alkyl group having 1 to 18 C atoms, an optionally $C_1$- to $C_6$-alkyl-substituted cycloalkyl group having a total of 5 to 12 C atoms, an optionally substituted aryl group having 6 to 10 C atoms or a linear or branched $C_1$–$C_{18}$-alkoxy group,
- $R^5$ represents a linear or branched alkyl group having 1 to 18 C atoms, an optionally $C_1$- to $C_6$-alkyl-substituted cycloalkyl group having a total of 5 to 12 C atoms, an optionally substituted aryl group having 6 to 10 C atoms or an aralkyl group having 7 to 12 C atoms, and
- n and m, independently of one another, represent an integer from 1 to 200, which copolymers are obtainable by the process according to the invention and are soluble in organic solvents and free of organically bound halogen.

The structures (III) and (III a) may be present side by side in any desired ratio and also in the same polymer molecule; furthermore, the sequences of the monomers and the polymer structure are arbitrary, but preferably random. However, blocks of different length may also occur in the molecules.

In the copolymers of the formulae (III) and (III a) according to the invention, $R^4$ preferably denotes methyl, phenyl or $OR^5$ and $R^5$ preferably denotes $C_1$- to $C_{18}$-alkyl, particularly preferably $R^4$=$OR^5$=methoxy, ethoxy, n-propoxy, n-butoxy, n-hexyloxy, 2-ethylhexyloxy, n-octyloxy, n-decyloxy, n-dodecyloxy or n-tetradecyloxy.

$R^1$ and $R^2$, independently of one another, preferably represent H or $C_1$ to $C_2$-alkyl, or $R^1$ represents H and $R^2$ represents $CH_2$—O—$R^3$, with $R^3$=H, $C_1$ to $C_4$-alkyl, and $R^1$ and $R^2$ particularly preferably represent H.

The compounds of the formula (I) according to the invention and the copolymers of the formulae (III) and (IIIa) according to the invention are preferably prepared by the process according to the invention.

The polythiophenes prepared by the process according to the invention or polythiophenes according to the invention are intense red-brown, red or violet-brown solids which are soluble in organic solvents, such as methylene chloride, chloroform or tetrahydrofuran, and whose solutions fluoresce. For applications, for example in the electronics industry, they are therefore readily processible from organic solution. Doped, cationic polythiophenes or polythiophene layers can be prepared readily, i.e. also using mild oxidizing agents, from such solutions in the presence of a counter ion.

The neutral compounds or copolymers prepared according to the invention or said compounds or copolymers according to the invention can therefore be used for the preparation of cationic and therefore doped polythiophenes, the neutral compounds or copolymers being oxidized in the presence of a protic acid.

The neutral compounds or copolymers prepared according to the invention or said compounds or copolymers according to the invention can also be used for the production of layers of cationic polythiophenes by applying the neutral compounds or copolymers to a substrate and oxidizing them by atmospheric oxygen in the presence of an organic sulphonic acid, for example from the group consisting of p-toluenesulphonic acid, p-n-dodecylbenzenesulphonic acid and poly(styrenesulphonic acid). The application to the substrate can be effected in the form of a solid or from solution before or after the oxidation. Suitable methods for applying solids or solutions to substrates are sufficiently well known. Application from solution by means of knife-coating, spin-coating or inkjet methods may be mentioned here by way of example.

The neutral compounds or copolymers prepared according to the invention or said compounds or copolymers according to the invention can moreover be used in neutral form or in subsequently doped and therefore cationic form for the production of electrical or electronic components, for example for the production of fluorescent elements, photocells or organic transistors, for the treatment of plastics films for the packaging of electronic components and for cleanroom packaging, for the antistatic treatment of cathode ray tubes, for the antistatic treatment of photographic films, as transparent heating, as transparent electrodes, as circuit boards or for electrically colourable window panes.

EXAMPLES

Example 1

(Poly(2,3-dihydrothieno[3,4-b][1,4]dioxine=PEDT)

1.422 g (10 mmol) of ethylene-3,4-dioxythiophene (EDT)=2,3-dihydrothieno[3,4-b][1,4]dioxine were initially introduced in 100 ml of chloroform. 3.083 g (19 mmol) of iron(III) chloride (anhydrous) were metered in in 10 portions in the course of 7.5 h while stirring at room temperature (23° C.). After stirring for a further 16 h at room temperature, 50 ml of concentrated ammonia and 100 ml of methylene chloride were added and stirring was continued for 1 h. After filtration, this process was repeated and the organic phase was then extracted by shaking with 0.05 molar ethylenediaminetetraacetate solution to remove remaining Fe ions. Thereafter, the dark red organic phase was washed several times with water, dried with sodium sulphate and then evaporated to dryness in a water-jet vacuum. The residue (0.7 g of crude product) was heated to reflux with ethanol for further purification. After cooling, 0.15 g of neutral PEDT was isolated as a red-brown powder. The product is soluble, for example in $CHCl_3$, $CH_2Cl_2$ or THF with an intense red-violet colour; the solutions fluoresce.

Molar mass ($M_w$) determined by means of gel permeation chromatography (GPC): 1 220 (polystyrene calibration)

IR spectrum (KBr pellet): 3105 $cm^{-1}$ ($U_{CH}$ of the thiophene terminal groups), 2970, 2920 and 2870 $cm^{-1}$ ($U_{CHaliph}$), 1480 $cm^{-1}$, 1435 $cm^{-1}$, 1370 $cm^{-1}$, 1070 $cm^{-1}$, 905 $cm^{-1}$. $^1$H-NMR spectrum (σ against TMS; $CDCl_3$): 4.0–4.5 ppm, aliph H; 6.1–6.4 ppm, thiophene H of the terminal groups.

Example 2

(Poly(2-methyl-2,3-dihydrothieno[3,4-b][1,4]dioxine)

2.03 g of (13 mmol) of 2-methyl-2,3-dihydrothieno[3,4-b][1,4]dioxine and 4.007 g (24.7 mmol) of iron(III) chloride (anhydrous) were reacted with one another analogously to Example 1, but under $N_2$, and working-up was carried out as described above. The crude product (1.4 g) was purified by heating under reflux with a few ml of methanol for 30 min. 0.88 g of the polymer was obtained in the form of a purple powder. The product is soluble, e.g. in $CHCl_3$, $CH_2Cl_2$ or THF with an intense red-violet colour; the solutions fluoresce.

Molar mass ($M_w$) according to GPC: 7 340 (polystyrene calibration)

Example 3

(Poly(2,3-dihydrothieno[3,4-b][1,4]dioxine=PEDT; preparation in the presence of a base)

2.844 g (20 mmol) of EDT were reacted with 6.164 g (38 mmol) of iron(II) chloride (anhydrous) analogously to Example 1, but under $N_2$ and in the presence of 7.6 g (75.9 mmol) of calcium carbonate, and working-up was carried out as described above. The crude product (0.53 g) was heated to reflux with a few ml of methanol for 30 min. After filtration, 0.39 g of PEDT was obtained.

Molar mass ($M_w$) according to GPC: 1 150 (polystyrene calibration)

Example 4

(Poly(2-(n-butoxymethyl)-2,3-dihydrothieno[3,4-b][1,4]dioxine)

2.143 g (10 mmol) of 2-(n-butoxymethyl)-2,3-dihydrothienyl[3,4-b][1,4]dioxine and 3.082 g (19 mmol) of $FeCl_3$ were reacted with one another analogously to Example 1, but under $N_2$, and purification was carried out analogously. 0.56 g of pure poly(2-(n-butoxymethyl)-2,3-dihydrothieno[3,4-b][1,4]dioxine was obtained as a red-brown powder, which is soluble in $CHCl_3$, $CH_2Cl_2$ or THF with an intense red-violet colour; the solutions fluoresce.

Molar mass ($M_w$) according to GPC: 8 330 (polystyrene calibration)

Example 5

Copolymer of EDT and 3,4-di-n-propoxythiophene 1.422 g (10 mmol) of EDT and 2.003 g (10 mmol) of 3,4-di-n-propoxythiophene were reacted with 6.164 g (38 mmol) of $FeCl_3$ analogously to Example 1, but under $N_2$ and in the presence of 3.8 g of calcium carbonate. Yield of pure product: 1.39 g of copolymer of EDT/dipropoxythiophene as a deep dark violet powder, which is soluble in $CHCl_3$, $CH_2Cl_2$ and THF and fluoresces in solution.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for the preparation of neutral compounds of the general formula (I),

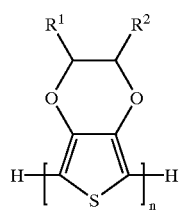

(I)

in which

R$^1$ and R$^2$, independently of one another, each represent H or C$_1$ to C$_9$-alkyl, or wherein R$^2$ represents CH$_2$—O—R$^3$, with R$^3$=H or C$_1$ to C$_9$-alkyl, cycloalkyl or aralkyl, when R$^1$ represents H, and n represents an integer from 2 to 200, comprising reacting monomers of the general formula (II),

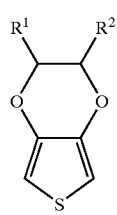

(II)

in which

R$^1$ and R$^2$ have the abovementioned meanings, with an oxidizing agent, wherein the reaction is carried out in an organic solvent and the oxidizing agent is used in an amount of 50 to 99.9% of the stoichiometrically required amount.

2. Process according to claim 1, wherein R$^1$ and R$^2$, independently of one another, each represent H or C$_1$ to C$_5$-alkyl, or wherein R$^2$ represents CH$_2$—O—R$^3$ with R$^3$=H or C$_1$ to C$_5$-alkyl when R$^1$ represents H.

3. Process according to claim 1, wherein R$^1$ and R$^2$, independently of one another, each represent H or C$_1$ to C$_2$-alkyl, or wherein R$^2$ represents CH$_2$—O—R$^3$ with R$^3$=H or C$_1$ to C$_4$-alkyl when R$^1$ represents H.

4. Process according to claim 1, wherein R$^1$ and R$^2$ represent H.

5. Process according to claim 1, wherein the oxidizing agent is an iron(III) compound.

6. Process according to claim 5, wherein the oxidizing agent is iron(III) chloride or iron(III) tosylate.

7. Process according to claim 6, wherein the oxidizing agent is iron(III) chloride.

8. Process according to claim 1, wherein the organic solvent is an aprotic solvent.

9. Process according to claim 1, wherein the organic solvent is a halogenated hydrocarbon.

10. Process according to claim 1, wherein the reaction is carried out in the presence of a base.

11. Process according to claim 10, wherein the base is an alkali metal or alkaline earth metal carbonate.

12. Process according to claim 1, wherein the oxidizing agent is used in an amount of 80 to 96% of the stoichiometically required amount.

13. Neutral compounds of the general formula (I),

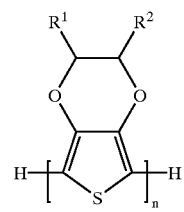

(I)

in which

R$^1$ and R$^2$, independently of one another, each represent H or C$_1$ to C$_9$-alkyl, or wherein R$^2$ represents CH$_2$—O—R$^3$, with R$^3$=H or C$_1$ to C$_9$-alkyl, cycloalkyl or aralkyl, when R$^1$ represents H, and n represents an integer from 2 to 200, wherein said compounds are soluble in organic solvents and are free of organically bound halogen.

14. Compounds according to claim 13, wherein R$^1$ and R$^2$ represent H.

15. Neutral copolymers of the formulae (III) or (IIIa),

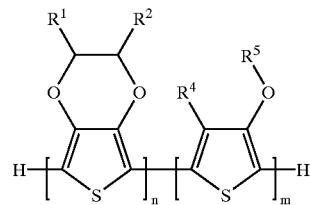

(III)

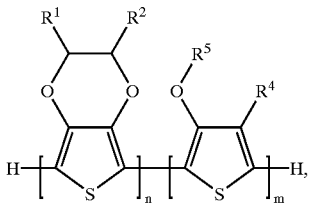

(IIIa)

in which

R$^1$ and R$^2$, independently of one another, each represent H or C$_1$ to C$_9$-alkyl, or wherein R$^2$ represents CH$_2$—O—R$^3$, with R$^3$=H or C$_1$ to C$_9$-alkyl, cycloalkyl or aralkyl, when R$^1$ represents H, R$^4$ represents a linear or branched alkyl group having 1 to 18 C atoms, an optionally C$_1$- to C$_6$-alkyl-substituted cycloalkyl group having a total of 5 to 12 C atoms, an optionally substituted aryl group having 6 to 10 C atoms or a linear or branched C$_1$–C$_{18}$-alkoxy group, R$^5$ represents a linear or branched alkyl group having 1 to 18 C atoms, an optionally C$_1$- to C$_6$-alkyl-substituted cycloalkyl group having a total of 5 to 12 C atoms, an optionally substituted aryl group having 6 to 10 C atoms or an aralkyl group having 7 to 12 C atoms, and n and m, independently of one another, represent an integer from 1 to 200, wherein said compounds are soluble in organic solvents and are free of organically bound halogen.

16. A method of preparing cationic polythiophenes comprising oxidizing neutral compounds or copolymers according to claim 13 in the presence of a protic acid.

17. A method of preparing cationic polythiophenes comprising oxidizing neutral compounds or copolymers according to claim 15 in the presence of a protic acid.

18. A method of preparing layers of cationic polythiophenes comprising applying neutral compounds or copolymers according to claim 13 to a substrate and oxidizing the applied compounds or copolymers by atmospheric oxygen in the presence of an organic sulphonic acid.

19. A method of preparing layers of cationic polythiophenes comprising applying neutral compounds or copolymers according to claim 15 to a substrate and oxidizing the applied compounds or copolymers by atmospheric oxygen in the presence of an organic sulphonic acid.

20. A process for preparing electrical or electronic components comprising incorporating the neutral compounds or copolymers according to claim 13.

21. A process for preparing electrical or electronic components comprising incorporating the neutral compounds or copolymers according to claim 15.

22. The process of claim 20, wherein the electrical or electronic component is selected from the group consisting of fluorescent elements, photocells, organic transistors, plastics films for the packaging of electronic components, cleanroom packaging, cathode ray tubes, photographic films, transparent heating, transparent electrodes, circuit boards and electrically colourable window panes.

23. The process of claim 21, wherein the electrical or electronic component is selected from the group consisting of fluorescent elements, photocells, organic transistors, plastics films for the packaging of electronic components, cleanroom packaging, cathode ray tubes, photographic films, transparent heating, transparent electrodes, circuit boards and electrically colourable window panes.

* * * * *